US006376605B1

(12) United States Patent
Sugimoto et al.

(10) Patent No.: US 6,376,605 B1
(45) Date of Patent: Apr. 23, 2002

(54) STYRENE RESIN AND RESIN COMPOSITION COMPRISING THE SAME

(75) Inventors: Ryuichi Sugimoto, Osaka; Kazu Shiba, Wakayama; Mune Iwamoto, Osaka, all of (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/245,065

(22) Filed: Feb. 5, 1999

(30) Foreign Application Priority Data

| Feb. 9, 1998 | (JP) | 10-027524 |
| Feb. 9, 1998 | (JP) | 10-027525 |
| Oct. 14, 1998 | (JP) | 10-292133 |

(51) Int. Cl.⁷ .............................. C08F 8/00; C08L 69/00
(52) U.S. Cl. .......................... 525/67; 525/146; 525/316
(58) Field of Search .......................... 525/316, 67, 146

(56) References Cited

U.S. PATENT DOCUMENTS 3,448,175 A   6/1969   Doak et al. .................. 525/243
4,972,024 A * 11/1990 Iwamoto et al. ............ 525/314

FOREIGN PATENT DOCUMENTS

EP   0 810 242   12/1997

* cited by examiner

*Primary Examiner*—Rachel Gorr
(74) *Attorney, Agent, or Firm*—Burns, Doane, Swecker & Mathis, L.L.P.

(57) ABSTRACT

A styrene resin is disclosed having excellent moldability and physical properties and is suited for recycling; and a thermoplastic polycarbonate composition with the styrene resin. The styrene resin contains 50 to 90 wt. % of a continuous phase component (S) composed of a copolymer of a styrene monomer, an unsaturated nitrile monomer; and 10 to 50 wt. % of a dispersed phase component on which said monomers have been grafted and which has occluded said copolymer. In the styrene resin, no triple chain unit AAA is detected from the unsaturated nitrite monomer component (A) in the continuous phase component (S) and a double chain unit AA amounts to 3% or less based on the whole units (A) detected.

15 Claims, 1 Drawing Sheet

Fig.1 copolymer composition curve of styrene-acrylonitrile

STYRENE RESIN AND RESIN COMPOSITION COMPRISING THE SAME

BACKGROUND OF THE INVENTION

1. Field of the Invention

This invention relates to a styrene resin having excellent moldability or formability and physical properties and a composition of said styrene resin and a thermoplastic polycarbonate resin. More specifically, the present invention pertains to a styrene resin which has excellent moldability or formability, does not undergo heat deterioration easily and has improved heat resistance and impact resistance; and a composition of said styrene resin and a thermoplastic polycarbonate resin.

2. Description of the Related Art

A styrene resin is conventionally known as a resin having excellent heat resistance and impact resistance and is used as a molding or forming material. For example, it is used for automobile parts, household electric parts, office machinery parts, mechanical parts or the like. In recent years, it has come to be used frequently as a material for large-sized thin-wall formation or high-speed injection molding, but the conventional resin is not satisfactory for such an application, due to low fluidity upon processing, its moldability or formability is poor and much time is required for processing. In addition, as the range of a molded or formed product widens with a decrease in the wall thickness of the product, the resin is required to have good impact resistance.

From a mixture of the styrene resin and a thermoplastic polycarbonate resin which is added in order to heighten the impact resistance of the styrene resin, a molded product having high impact resistance is available. Such a resin composition needs a higher molding or forming temperature to heighten its fluidity, but an increase in the molding or forming temperature causes a deterioration in its physical properties due to thermal decomposition of the rubber phase in the styrene resin.

On the other hand, recycling of such a general-purpose plastic material is desired from the viewpoint of maintaining the environment on the earth so that a recycling method is under investigation. In this case, deterioration of its physical properties due to thermal decomposition of a rubber phase in the styrene resin occurs when the plastic material is molded or formed in repetition.

Particularly when a thermoplastic polycarbonate resin is used as an impact strength improving agent, emulsion polymerization is frequently employed for preparing a styrene resin which is ordinarily known as an ABS resin. This process is however accompanied with the problem that an emulsifier or coagulant used for the preparation of the styrene resin remains in the resin and such impurities in the ABS resin cause deterioration of the resin and lower its physical properties or thermally change the color of the resin, which prevents the resin from recycling use.

For example, in Japanese Patent Application Laid-Open No. 240352/1987 from line 12 of the left column on page 1 to line 20 of the upper right column on page 2, disclosed is a process which comprises mixing an aromatic thermoplastic polycarbonate resin with a graft copolymer which has been obtained by the graft copolymerization of at least two monomers selected from aromatic vinyl monomers, vinyl cyanide monomers and alkyl methacrylate ester monomers on a rubbery polymer, contains at least 60 wt. % of a rubbery polymer component, has a graft ratio of less than 50% to the rubbery polymer and has a non-graft resin component of an intrinsic viscosity of 0.6 dl/g or lower.

In the above-described process, owing to a large content of the rubbery polymer in the polymer, mechanical strength, particularly, stiffness lowers largely and in addition, fluidity lowers. In addition, heat resistance must be improved. Moreover, emulsion polymerization, which is adopted as a polymerization method, needs subsidiary raw materials such as an emulsifier and also waste water treatment, which makes the process complex and cost-consuming. Thus, the problems of the above-described process have remained yet.

In Japanese Patent Publication No. 39176/1987, from line 39 on the left column to line 42 on the right column on page 2, disclosed is a process which comprises mixing, with a thermoplastic polycarbonate resin and two ABS resins, each ABS resins having a rubber particle size and graft ratio within a specific range, but being different from each other, thereby the impact resistance at low temperatures is improved.

The above-described process is however complex and therefore industrially disadvantageous, because two graft polymers having different compositions are prepared respectively, a copolymer is prepared from another monomer mixture and then, the resulting graft polymers are mixed with a thermoplastic polycarbonate resin.

In Japanese Patent Application Laid-Open No. 148258/1986, from line 10 on the right column on page 1 to line 15 on the lower right column on page 2, disclosed is a process in which two ABS resins having a low rubber content and a high rubber content, respectively and, if necessary, an AS resin are mixed in order to improve the balance between heat resistance, impact resistance and moldability or formability.

It is however difficult to prepare an ABS resin having a high rubber content and high graft ratio without a limitation on the preparing process and particularly, bulk polymerization cannot be applied. In addition, this process is also complex because, similar to the above-described case, two or three ABS resins and, if necessary, one AS resin must be prepared respectively and they are mixed with a thermoplastic polycarbonate resin.

The conventional styrene resin, such as ABS resin, containing a rubbery polymer is prepared by emulsion polymerization, bulk polymerization or solution polymerization, but, some styrene resins happen to undergo denaturation and are colored seriously by heating.

When a styrene resin is formed into a corresponding alloy with a thermoplastic polycarbonate resin, it happens to have lowered mechanical physical properties owing to the hydrolysis of the thermoplastic polycarbonate resin, which however depends on the kind of the styrene resin.

There is accordingly a demand for the provision of a styrene resin composition which can be molded or formed at a relatively low temperature, is not deteriorated or colored even by the molding or forming at high temperature or molding or forming in repetition, and has largely improved moldability or formability, good heat resistance and improved impact strength.

An object of the present invention is to provide a resin composition of a styrene resin, which is excellent in moldability or formability and physical properties, with a thermoplastic polycarbonate resin. There is a strong desire for the development of a process which can provide, at a low cost, a resin composition of a styrene resin and a thermoplastic polycarbonate resin, said styrene resin causing no deterioration of the thermoplastic polycarbonate resin after mixing and having largely improved moldability or formability, good heat resistance and improved impact resistance.

SUMMARY OF THE INVENTION

With a view to overcoming the above-described defects, the present inventors have carried out various investigations. As a result, it has been found that an amount of a specific component contained in a styrene resin has an influence on the deterioration of the physical properties of the styrene resin, leading to the completion of the present invention.

Described specifically, the present invention has the following constitution:

(a) A styrene resin which comprises 50 to 90 wt. % of a continuous phase component (S) composed of a copolymer of a styrene monomer and an unsaturated nitrile monomer, or a styrene monomer, an unsaturated nitrile monomer and another monomer copolymerizable therewith; and 10 to 50 wt. % of a dispersed phase component (which will hereinafter be called "rubbery polymer component") composed of a rubbery polymer component on which said monomers have been grafted and which has occluded said copolymer; wherein a triple consecutive chain unit AAA cannot be detected from the unsaturated nitrile monomer units (A) in the continuous phase component (S) and a double chain consecutive unit AA amounts to 3% or less based on the whole units (A) detected, a reduced viscosity ($\eta_{sp/c}$) of the continuous phase component (S) is 0.2 to 0.85 dl/g and an amount of metal component of Group I and/or II of the periodic table is less than 100 wt.ppm or less in terms of a metal.

DESCRIPTION OF THE PREFERRED EMBODIMENTS (b) A styrene resin as described in (a), wherein said rubbery polymer component has a weight average particle size of 0.1 to 3 µm.

(c) A styrene resin as described in (a), which contains an organic sulfur compound in an amount of 0.01 to 0.5 wt. % in terms of a sulfur content.

(d) A styrene resin as described in (a), wherein the continuous phase component (S) has a reduced viscosity ($\eta_{sp/c}$) of 0.2 to 0.65 dl/g.

(e) A styrene resin as described in (a), wherein the AA chain unit of the continuous phase component (S) amounts to 2.5% or less based on the whole units (A) detected.

(f) A styrene resin as described in (a), wherein the AA chain unit of the continuous phase component (S) amounts to 2.0% or less based on the whole units (A) detected.

(g) A styrene resin as described in (a), wherein the measurement of the unsaturated nitrile monomer component (A) in the continuous phase component (S) is conducted by $^{13}$C-NMR.

(h) A styrene resin as described in (a), wherein an amount of the metal component of Group I and/or II of the periodic table is less than 20 wt.ppm in terms of a metal.

(i) A styrene resin as described in (h), wherein a total amount of a halogen compound and an inorganic acid is less than 10 wt.ppm in terms of a halogen and an acid radical.

(j) A resin composition comprising 10 to 500 parts by weight of a styrene resin as described in (a) and 100 parts by weight of a thermoplastic polycarbonate resin having a viscosity average molecular weight of 8,000 to 55,000.

(k) A resin composition as described in (j), which comprises 20 to 300 parts by weight of a styrene resin and 100 parts by weight of a thermoplastic polycarbonate resin.

(l) A recycling method, which comprises collecting a molded or formed product of a styrene resin as described in (a) and producing therefrom another molded or formed product.

(m) A recycling method, which comprises collecting a molded or formed product of a resin composition as described in (j) and producing therefrom another molded or formed product.

The conventional rubbery-polymer-containing styrene resin such as ABS resin is produced by emulsion polymerization, bulk polymerization or solution polymerization. Some styrene resins however undergo denaturation by heat and happen to be colored seriously.

A styrene resin when formed into a corresponding alloy with a thermoplastic polycarbonate resin happens to have lowered mechanical physical properties owing to the hydrolysis of the thermoplastic polycarbonate resin, which, however, depends on the kind of the styrene resin.

The present inventors have carried out an investigation on the provision of a styrene resin which is not decomposed or colored easily by heat and a styrene resin which does not cause hydrolysis of a thermoplastic polycarbonate resin even when an alloy is formed from them, leading to the completion of the present invention.

In order to overcome the above-described problems, it is necessary to:

(1) restrict the incorporation of impurities such as emulsifier (a compound of Group I and/or II of the periodic table), acid and halogen compound to a small amount, because they become a cause for thermal denaturation and color change of the styrene resin or serve as a catalyst for the hydrolysis of a thermoplastic polycarbonate resin, and (2) severely control the chain distribution of nitrile units, because the chromophoric group produced by the thermal decomposition of the nitrile units of the styrene resin is presumed to have the following structure (Chemical formula 1) and this structure causes coloration and deterioration in the impact resistance.

Concerning (1), the conventional styrene resin such as ABS obtained by emulsion polymerization contains, in the emulsifier and coagulant used for the polymerization of the rubbery polymer and styrene resin, a compound of Group I and/or II of the periodic table in an amount of 1000 wt.ppm or greater in terms of a metal and also an inorganic acid and/or halogen compound in an amount of 100 wt.ppm or greater in terms of an acid group and/or halogen.

Also in the case of solution polymerization or bulk polymerization, a compound of Group I and/or II of the periodic table, halogen compound and acid group are contained much in the rubbery polymer used.

Accordingly, in the process of the present invention, a rubbery polymer whose contents of the compound of Group I and/or II of the periodic table, inorganic acid and halogen compound are small must be used for the preparation of a styrene polymer. As a process for the preparation of the styrene resin, continuous bulk polymerization is preferably used.

Concerning (2), a styrene resin is prepared so as to contain the chain structure of the consecutive nitrile monomer units in a small amount.

Figure 1:
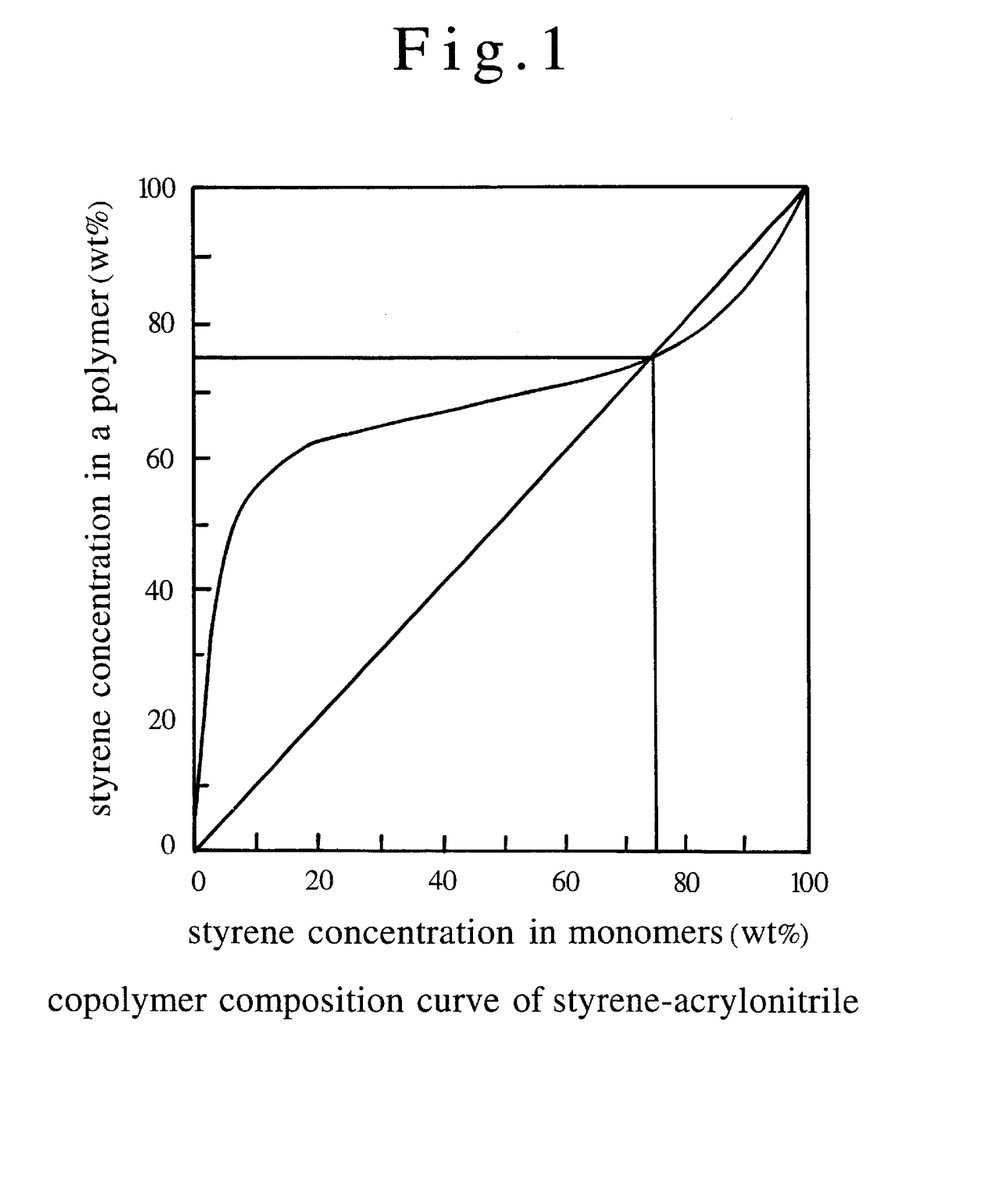
FIG. 1 is a curve copolymer composition of a styrene-acrylonitrile, which illustrates the copolymerizability of styrene and acrylonitrile used for typical copolymerization in the present invention.

FIG. 1 is a curve of a copolymer composition styrene-acrylonitrile which indicates the relation between a styrene concentration in a monomer mixture to be used for the polymerization and a styrene concentration in the resulting polymer.

According to this curve, when the acrylonitrile concentration in the monomer becomes 30 wt. % or greater, the acrylonitrile concentration in the polymer shows a drastic increase. Therefore, it is necessary to control the acrylonitrile monomer concentration in the polymerization system to 30 wt. % or less, preferably 28 wt. % or less and at the same time, to control the monomer ratio precisely to prepare a styrene resin whose content of consecutive nitrile monomer units is low.

In the process of the present invention, the content of the consecutive nitrile monomer units is measured as a chain distribution of the unsaturated nitrile monomer component contained in the continuous phase component (S) of the styrene resin. It has a particularly important meaning for the stability of the styrene resin. Here, the continuous phase component (S) in the styrene resin is obtained by removing from the styrene resin a component insoluble in a 7:3 (volumetric ratio which will be applied equally hereinafter) mixture of methyl ethyl ketone and methanol. The chain distribution of the unsaturated nitrile monomer component is measured in the following manner: the continuous phase component (S) is dissolved in deuterated chloroform, $^{13}$C-NMR is measured and by making use of the fact that shifting and division of signal shift of α-carbon of the unsaturated nitrile monomer component is observed in accordance with a difference in the component between adjacent monomers, a chain unit ratio is obtained from the integral value. The method is not limited to the above one insofar as the chain distribution of the unsaturated nitrile monomer component can be measured. Various methods, for example, pyrolysis chromatography wherein the chain bond ratio is found by determining, by gas chromatography, the amount of the decomposition product caused by pyrolysis of a styrene resin can also be employed.

From the chain distribution of the unsaturated nitrile monomers (A) in the continuous phase component (S) which can be detected when $^{13}$C-NMR of the continuous phase component (S) in the styrene resin of the present invention is measured, no triple consecutive chain unit AAA is detected and double consecutive chain units AA amount to 3% or less, preferably 2.5% or less, more preferably 2.0% or less based on the whole components (A) detected. If a triple chain unit AAA is detected from the chain distribution of the unsaturated nitrile monomer components in the continuous phase component (S) or double consecutive chain units AA exceeds 3% based on the whole components (A) detected, fluidity and impact strength of the composition of the styrene resin with a thermoplastic polycarbonate resin lowers. A content of double or triple consecutive chain units outside the above range is therefore not preferred.

In the present invention, the reduced viscosity of the continuous phase component (S) obtained by removing from a styrene resin a component insoluble in a 7:3 mixture of methyl ethyl ketone and methanol ranges from 0.2 to 0.85 dl/g, preferably 0.25 to 0.65 dl/g, more preferably 0.3 to 0.55 dl/g. The reduced viscosity less than 0.2 dl/g is not preferred, because it causes a marked reduction in the impact strength. On the other hand, the reduced viscosity exceeding 0.85 dl/g is not preferred, because it deteriorates fluidity, leading to a reduction in the impact strength.

The reduced viscosity described here is a value available by precisely weighing 0.25 g of the continuous phase component (S), dissolving it in 50 ml of dimethyl formamide over 2 hours and measuring the resulting solution at 30° C. by using an Ubbelohde viscometer whose flow-through time is 20 to 100 seconds. The reduced viscosity can be found from the flow-through second ($t_o$) of the solvent and flow-through second (t) of the solution in accordance with the following equation:

$$\text{Reduced viscosity } (\eta_{sp/c}) = \{(t/t_o) - 1\}/0.5$$

The styrene resin according to the present invention is preferably prepared by bulk polymerization method. It contains a metal component of Group I and/or II of the periodic table in terms of metal in an amount not greater than 100 wt.ppm, preferably not greater than 50 wt.ppm, more preferably not greater than 20 wt.ppm, most preferably 0 in terms of a metal. In addition, the resin is more preferred when it contains an organic sulfur compound in an amount not less than 0.01 wt. % but less than 0.5 wt. %, preferably not less than 0.01 wt. % but less than 0.3 wt. %, in terms of sulfur.

The content of the metal component of Group I and/or II of the periodic table in terms of metal exceeding 100 wt.ppm in terms of a metal or the content of sulfur less than 0.01 wt. % is not preferred, because the rubber polymer contained in the styrene resin or a thermoplastic polycarbonate resin tends to undergo decomposition owing to heat. The content of sulfur exceeding 0.5 wt. % is also not preferred, because thermal change tends to cause coloring and thermal decomposition at the molding or forming time generates an offensive odor.

As a styrene resin which contains only a small amount of a metal component of Group I and/or II of the periodic table and contains a sulfur component in an amount not less than 0.01 wt. % but less than 0.5 wt. % in terms of sulfur, that prepared by solution polymerization or bulk polymerization is preferred, because impurities such as emulsifier do not remain in the product.

The styrene resin of the present invention is prepared by bulk or solution polymerization in a polymerization tank with piston flow or a complete mixing tank. In addition, when an ABS resin is obtained by polymerization, it is necessary to continuously control the ratio of AN monomer/styrene monomer to a predetermined value in the system by side feeding. In addition, it is necessary to limit the amounts of the metal component of Group I and/or II of the periodic table, the halogen compound and/or inorganic acid component or to remove these components from the polymer.

In the present invention, "to control the ratio of AN monomer/styrene monomer to a predetermined value"

means to control the acrylonitrile content of the copolymer formed in the polymerization system to a range within ±3% of a predetermined value, more specifically, to control the content of the acrylonitrile monomer in all the monomers in the polymerization system to a range within ±3% of a predetermined value. For example, when a predetermined value is 28 wt. %, the content must be controlled to 28±0.084 wt. %. As can be seen from the curve copolymer composition of an acrylonitrile-styrene of FIG. 1, the polymerization ratio of acrylonitrile increases and AAA chains tend to occur when the acrylonitrile content in all the monomers exceeds about 30 wt. %, so it is necessary to precisely control the content so as not to exceed 30%.

Impurities such as metal component of Group I and/or II of the periodic table, halogen compound and inorganic acid or derivative thereof enter into the styrene resin from the rubbery polymer so that it is necessary to select the rubbery polymer in consideration of such impurities and a ratio of the rubbery polymer used in the styrene resin. In the present invention, a rubbery polymer containing a metal component of Group I and/or II of the periodic table in terms of metal in an amount not greater than 500 ppm, more preferably, not greater than 100 ppm can be employed.

The rubbery polymer component which forms a dispersed phase as particles having a weight average particle size of 0.1 to 3 $\mu$m is particularly preferred when the rubbery polymer is dissolved in a solvent and/or a monomer and polymerized with at least a styrene monomer and an unsaturated nitrile monomer and if necessary another monomer copolymerizable therewith.

The rubbery polymer component having a particle size larger or smaller than the above range is not preferred, because it lowers the impact strength of the molded or formed product. When the weight average particle size of the rubbery polymer component is less than 0.1 $\mu$m, the impact strength is not so much improved, while that of the rubbery polymer component is greater than 3 $\mu$m, not only the impact strength lowers but also the surface of the molded or formed product becomes rough. The particle size outside the above range is therefore not preferred. It is more preferred that the rubbery polymer component is prepared so as to form a dispersed phase as particles having a weight average particle size of 0.3 to 1.5 $\mu$m.

The styrene resin of the present invention is required to contain 10 to 50 parts by weight, preferably 15 to 45 parts by weight, more preferably 20 to 40 parts by weight of a rubbery polymer component having a copolymer of monomers grafted thereon and occluded therein, that is, a dispersed phase component.

When the dispersed phase component is less than 10 parts by weight, impact strength is not improved sufficiently. Amounts exceeding 50 parts by weight, on the other hand, lower moldability or formability or deteriorate heat resistance. Amounts outside the above range are therefore not preferred.

The present invention features that by using a thermoplastic polycarbonate resin and a styrene resin in combination, impact resistance shows an unexpectedly large increase and at the same time, markedly high fluidity can be obtained.

It is not clear why such a marked improvement in the fluidity and impact resistance is brought about by the process of the present invention, compared with the conventional process. It is generally known from the conventional findings that as the molecular weight of a resin lowers, the fluidity is improved but impact strength lowers.

In the present invention, an improvement in the impact strength owing to a lowering in a molecular weight of continuous phase component (S) of the styrene resin in terms of a reduced viscosity is presumed to owe to the special properties of the mixture of a thermoplastic polycarbonate resin and styrene resin. In addition, a specific chain distribution of a polymer component forming the continuous phase of the styrene resin and use of a rubbery polymer component which has a predetermined particle size and has a graft.occlusion structure as a dispersed phase are presumed to have influences on the improvement.

The styrene resin of the present invention is preferably prepared by bulk polymerization and polymerization is carried out by supplying an unsaturated nitrile monomer and a styrene monomer in the presence of a rubbery polymer. Preferred as the styrene resin is that prepared by continuous polymerization while supplying an unsaturated nitrile monomer in an amount of 30 wt. % or less, preferably 28 wt. % or less based on the whole monomers supplied.

The present styrene resin contains acrylonitrile monomer unit preferably more than 10 wt % as acrylonitrile monomer unit×100/(acrylonitrile monomer unit+styrene monomer unit).

In the present invention, it is necessary to carry out continuous polymerization by using as a polymerizer plural complete mixing tanks or piston flow type polymerization tanks and in addition, to adjust a ratio of the acrylonitrile monomer to the other monomers in the polymerization system to a predetermined value (within ±3% of an expected amount of AN in each tank) by side feeding of the monomers. Particularly in the polymerization of an ABS resin, for example, the ratio of acrylonitrile to the total of the acrylonitrile and styrene must be adjusted precisely to 30 wt. % or less.

The rubbery polymer component in the particulate form is prepared, for example, by dissolving a rubbery polymer, which has been synthesized by solution polymerization, in a monomer and if necessary, in a solvent such as ethyl benzene, toluene or methyl ethyl ketone, adding or not adding a molecular weight regulator, polymerization initiator or the like to the resulting solution, and continuously feeding the resulting monomer solution of the rubbery polymer to an agitation type reactor, thereby copolymerizing a portion or whole portion of said monomer. At this time, the weight average particle size of the rubbery polymer component is adjusted to 0.1 to 3 $\mu$m by controlling the dissolving amount of the rubbery polymer, amount of a molecular weight regulator or polymerization initiator, polymerization temperature and agitation speed, whereby the rubbery polymer component can form a dispersed phase as a weight average particle size of 0.1 to 3 $\mu$m. After the polymerization ratio is adjusted to allow the polymer mixture to contain 10 to 50 parts by weight, preferably 15 to 45 parts by weight, more preferably 20 to 40 parts by weight of the rubbery polymer component, the polymer mixture thus obtained is introduced into a volatile-matter eliminating tank, whereby the unreacted monomers and solvent, if any, are separated from the polymer component. After a pelletizing step, a resin component can be obtained in the form of pellets.

The styrene resin according to the present invention comprises a copolymer composed of a rubbery polymer and a copolymer composed of a styrene monomer and an unsaturated nitrile monomer and if necessary another monomer.

Examples of the styrene monomer include styrene, aromatic α-alkylmonovinylidene monomer (for example, α-methylstyrene, α-ethylstyrene, α-methylvinyltoluene, α-methyldialkylstyrene); ring-substituted alkylstyrene (for example, o-, m- and p-vinyltoluene, o-ethylstyrene, p-ethylstyrene, 2,4-dimethylstyrene and p-tertiary butyl styrene); ring-substituted halostyrene (for example, o-chlorostyrene, p-chlorostyrene, o-bromostyrene and 2,4-dichlorostyrene) ring-alkyl, ring-(halo-substituted) styrene (ex. 2-chloro-4-methylstyrene; vinyl naphthalene; and vinyl anthracene. They may be used either singly or in combination. The above-described substituted alkyl group has 1 to 4 carbon atoms and includes isopropyl and isobutyl groups. Among them, styrene and aromatic monovinylidene monomer may preferably be used either singly or in combination.

Examples of the unsaturated nitrile monomer include acrylonitrile, methacrylonitrile, ethacrylonitrile and fumaronitrile and mixtures thereof.

Examples of the rubbery polymer include conjugated 1,3-diene (ex. butadiene and isoprene) Polymer such as polybutadienes, styrene-butadiene copolymer and EDPM (ethylene-propylene-dienemethylene linkage) and mixtures thereof.

There is no particular limitation imposed on "another monomer" of the present invention, insofar as it is copolymerizable with the styrene monomer and unsaturated nitrile monomer. Examples include acrylates such as methyl methacrylate and maleimides such as N-phenylmaleimide and cyclohexylmaleimide.

In the present invention, the styrene resin (I) is added in an amount of 10 to 500 parts by weight, preferably 15 to 300 parts by weight, more preferably 20 to 300 parts by weight relative to 100 parts by weight of the thermoplastic polycarbonate resin (II). When the amount of (I) is less than 10 parts by weight, sufficient improvement in impact strength is not attained. When the amount of (I) is greater than 500 parts by weight, a deterioration in moldability or formability occurs and heat stability lowers.

The constitution of the present invention also embraces the incorporation of an ABS resin, polymer or additive other than (I) or (II) as needed. As another polymer, acrylic elastomers such as styrene-acrylonitrile resin, butadiene rubber, SBR, ethylene-propylene rubber, acrylate ester—butadiene copolymer are preferred.

Examples of the thermoplastic polycarbonate resin in the present invention include aromatic polycarbonates, aliphatic polycarbonates and aliphatic-aromatic polycarbonates. In general, a polymer or copolymer composed of a bisphenol such as 2,2-bis(4-oxyphenyl)alkane, bis(4-oxyphenyl)ether, bis(4-oxyphenyl)sulfone, bis(4-oxyphenyl)sulfide or bis(4-oxyphenyl)sulfoxide is used as raw material. Polymers using a halogen-substituted bisphenol are also used as a raw material of thermoplastic polycarbonate resin, though depending on the purpose. The above-exemplified thermoplastic polycarbonate resins can be used either singly or in combination. Each of these thermoplastic polycarbonate resins is preferred to have a viscosity average molecular weight of 8000 to 55000, preferably 15000 to 40000.

There is no particular limitation imposed on the thermoplastic polycarbonate resin insofar as it is commercially available. That available by the reaction between a dihydroxyaryl compound and phosgene or the ester exchange between a dihydroaryl compound and diphenyl carbonate can be used. The thermoplastic polycarbonate resin obtained using phosgene sometimes contains a halogen derived from the raw material so that it is preferred to reduce a halogen content prior to use.

The continuous phase component (S) of the styrene resin (I) according to the present invention is obtained by dissolving the styrene resin (I) in a 7:3 mixed solvent of methyl ethyl ketone and methanol (by adding 30 g of the solvent to 1 g of the polymer and then stirring the resulting mixture at room temperature for 2 hours), separating the resulting solution into soluble and insoluble matters by centrifugal separation and re-precipitating the supernatant soluble matter in methanol.

As a process for preparing the composition of the present invention, kneading (I) and (II) and if necessary another resin in a known mixer such as extruder can be mentioned by way of example. It is also possible to, after mixing (I) and (II), add to the resulting mixture a known polymer usually employed for a thermoplastic resin composition such as acrylonitrile.styrene copolymer, MBS, styrene.butadiene copolymer or acrylic rubbery polymer in order to impart it with gloss, flame retardancy, mechanical strength, chemical resistance or the like.

At the molding of a conventional thermoplastic polycarbonate resin.styrene resin mixture, a resinous substance adheres to a mold, for example, at injection molding. By the use of the composition according to the present invention, the amount of such a resinous adherent substance can be substantially decreased, which is also one of the important advantages of the present invention. The reason for this effect is not clear, but such a reduction in the generation of a resinous substance is presumed to occur because the unsaturated nitrile component contained in the continuous phase component of the styrene resin of the present invention has a specific distribution and in addition, a specific rubbery polymer is employed.

The styrene resin of the present invention and a resin composition containing it have good heat stability so that even after repetition of molding or forming, color hue and physical properties of the molded or formed product do not lower so much. They are therefore suited for recycling use. No particular limitation is imposed on the recycling method, however, in general, a molded or formed product can be recycled in an ordinary manner by pulverizing it, adding a stabilizer as needed and molding or forming the resulting pellets.

By the combination according to the present invention, physical properties of the mixture of the thermoplastic polycarbonate resin and styrene resin show a drastic improvement.

The present invention will hereinafter be described in more specifically by the following examples and comparative examples. It should however be borne in mind that the present invention is not limited by these examples.

Test a

In each of Examples a-1 to a-3 and Comparative Examples a-1 to a-3, styrene and acrylonitrile were copolymerized in the presence of a rubbery polymer and the performance of the resulting polymer was evaluated in accordance with the following standards.

(1) Measurement of Impact Strength

The impact strength of a test piece cut from the molded product was measured by the Izod impact testing method (ASTM D 256).

(2) Measurement of Heat Resistant Temperature

The Vicat softening point of a test piece cut from the molded product was measured in accordance with ASTM D 1525.

(3) Observation of Adhesion to a Mold

The adhesion to the inside of the venting hole of a extruder after 250 times shot at a cylinder temperature of 260° C. and a mold temperature of 50° C. was visually observed and if adhesion of resinous substance was not observed, judgment was A, while if adhesion of resinous substance was observed, judgment was B.

EXAMPLE a-1

Preparation of a Styrene Resin

A raw material solution composed of 65 parts by weight of styrene, 10 parts by weight of acrylonitrile, 15 parts by weight of ethyl benzene, 10 parts by weight of a butadiene styrene copolymer, 0.05 part by weight of an organic peroxide and 0.18 part by weight of tertiary dodecyl mercaptan was prepared. The resulting raw material solution was fed continuously to an agitation type reactor having three polymerization tanks arranged in a row, wherein polymerization was carried out. Incidentally, the [AN/(AN+ST)]×100 of each of the second and third tanks was adjusted to have a fluctuation width within ±1% of that of the first tank by feeding each tank with the monomer from a side feed line. Described specifically, the [AN/(AN+ST)]×100 of the first tank was 13.3 wt. % so that that of each of the second and third tanks was kept within a range of 13.4 to 13.2 wt. %. This will apply equally hereinafter to the % of the fluctuation range. From the third-stage tank, the polymer solution was introduced into a separation and collection step composed of a preheater and vacuum chamber.

From the collection step, the resulting resin was fed to an extrusion step, whereby the styrene resin was obtained in the form of pellets. The continuous phase component (S) obtained by removing, from the resulting resin, a component insoluble in a 7:3 mixture of methyl ethyl ketone and methanol had a reduced viscosity (aspic) of 0.45 dl/g and the content of a rubbery polymer component was 30.5%. Concerning the chain structure of the unsaturated nitrile monomer unit, the continuous phase component (S) was analyzed by $^{13}$C-NMR, whereby the molar concentration of each unit and also the ratio of the chain unit were determined. As a result, no triple chain unit was detected from the chain distribution of the acrylonitrile monomer unit (A) and the double chain unit AA amounted to 1.8% of the unit (A). The concentration of a metal component of Group I and/or II of the periodic table in terms of metal was 13 ppm, while a halogen and/or inorganic acid component was not detected at all. Measuring results of the physical properties are shown in Table 1.

EXAMPLE a-2

A raw material solution composed of 55 parts by weight of styrene, 16 parts by weight of acrylonitrile, 20 parts by weight of ethyl benzene, 9 parts by weight of a styrene-butadiene block copolymer, 0.05 part by weight of an organic peroxide and 0.15 part by weight of tertiary dodecyl mercaptan was prepared, followed by polymerization as in Example a-1. The [AN/(AN+ST)]×100 of each of the second and third tanks was adjusted to a fluctuation range within ±1% of that of the first tank by feeding the monomer from the side feed line of each tank. The continuous phase component (S) of the resulting styrene resin had a reduced viscosity of 0.37 dl/g and the content of a rubbery polymer component was 31.5%. The continuous phase component (S) obtained by removing from the resulting resin a component insoluble in a 7:3 mixture of methyl ethyl ketone and methanol was analyzed by $^{13}$C-NMR and the chain distribution ratio was determined. As a result, no triple chain unit AAA was detected from the chain distribution of the acrylonitrile monomer unit (A), while the double chain unit AA amounted to 2.0% of the unit A detected. A metal component of Group I and/or II of the periodic table in terms of metal was contained in an amount of 11 ppm, but a halogen and/or inorganic acid component was not detected at all. Measuring results of the physical properties are shown in Table 1.

EXAMPLE a-3

In a similar manner to Example a-1 except for the use of 60 parts by weight of styrene, 13 parts by weight of acrylonitrile, 20 parts by weight of ethyl benzene, 7 parts by weight of an ethylene-propylene-ethylidene norbornene terpolymer (ethylene unit: 58%, diene unit: 5%, intrinsic viscosity: 1.0 dl/g), 0.05 part by weight of an organic peroxide (similar to that used in Example a-1) and 0.18 part by weight of tertiary dodecyl mercaptan, polymerization was carried out. Incidentally, the [AN/(AN+ST)]×100 of each of the second and third tanks was adjusted to a fluctuation range within ±1% of that of the first tank by feeding the monomer from the side feed line of each tank.

The continuous phase component (S) of the resulting styrene resin had a reduced viscosity of 0.55 dl/g and the content of a rubbery polymer component was 22.0%. The continuous phase component (S) obtained by removing from the resulting resin a component insoluble in a 7:3 mixture of methyl ethyl ketone and methanol was analyzed by C-NMR and the chain distribution ratio was determined. As a result, no triple chain unit AAA was detected from the chain distribution of the acrylonitrile monomer unit (A), while the double chain unit AA amounted to 1.9% of the unit A detected. Neither a metal component of Group I and/or II of the periodic table nor a halogen and/or inorganic acid component was detected. Results of the physical properties are shown in Table 1.

Comparative Example 1-a

In a similar manner to Example a-1 except for the use of 35 parts by weight of styrene, 35 parts by weight of acrylonitrile, 20 parts by weight of ethyl benzene and 10 parts by weight of a butadiene copolymer, polymerization was carried out. Incidentally, the [AN/(AN+ST)]×100 of each of the second and third tanks was adjusted to a fluctuation range within ±1% of that of the first tank by feeding the monomer from the side feed line of each tank.

The continuous phase component (S) of the resulting styrene resin had a reduced viscosity ($\eta_{sp/c}$) of 0.50 dl/g and the content of a rubbery polymer component was 29.2%. As a result of determining a chain component ratio of the unsaturated nitrile monomer unit, the triple chain unit AAA amounted to 0.3% of the chain distribution of the acrylonitrile monomer unit (A) and the double chain unit AA amounted to 15% of the unit A detected. A metal component of Group I and/or II of the periodic table in terms of metal amounted to 12 ppm, while a halogen and/or inorganic acid component was not detected at all. Measuring results of the physical properties and the like are shown in Table 1.

Comparative Example a-2

Twenty parts by weight (solid content) of a polybutadiene latex, 40 parts by weight of styrene and 40 parts by weight of acrylonitrile were subjected to emulsion graft polymerization. The latex of the graft copolymer thus obtained was coagulated with dilute sulfuric acid, followed by washing, filtration and drying. The continuous phase component (S) of the resulting copolymer had a reduced viscosity of 0.59 dl/g and the content of the rubbery polymer component was 34.5%. As a result of the determination of a chain distribution ratio, a triple chain unit AAA amounted to 0.5% of the chain distribution of the acrylonitrile monomer unit (A), while a double chain unit AA amounted to 18% of the unit A detected. The amount of a metal component of Group I and/or II of the periodic table in terms of metal detected was 100 ppm or greater, while the content of a sulfuric acid component was 100 ppm or greater. The results are shown in Table 2.

Comparative Example a-3

Thirty parts by weight (solid content) of a polybutadiene latex, 45 parts by weight of styrene and 25 parts by weight of acrylonitrile were subjected to emulsion graft polymerization. The latex of the resulting graft copolymer was coagulated with calcium chloride, followed by washing, filtration and drying. The continuous phase component (S) of the resulting copolymer had a reduced viscosity of 0.55 dl/g and the content of the rubbery polymer component was 53.2%. As a result of the determination of a chain distribution ratio, a triple chain unit AAA amounted to 0.1% of the chain distribution of the acrylonitrile monomer unit (A), while the double chain unit AA amounted to 9% of the unit A detected. A metal component of Group I and/or II of the periodic table in terms of metal was detected in an amount of 100 ppm or greater, while chlorine was also contained in an amount of 100 ppm or greater. The results are shown in Table 2.

Comparative Example a-4

To the styrene resin obtained in Example a-1, 100 ppm of ferric chloride was added and the hue was tested. The results are shown in Table 2.

TABLE 1

| Examples | a-1 | a-2 | a-3 |
|---|---|---|---|
| Styrene resin composition | | | |
| Content of rubbery polymer component wt. % | 30.5 | 31.5 | 22.0 |
| Average particle size of rubbery polymer component μm | 0.8 | 1.3 | 2.8 |
| Amount of AAA chain unit % | None | None | None |
| Amount of AA chain unit % | 1.8 | 2.0 | 1.9 |
| Reduced Viscosity dl/g | 0.45 | 0.37 | 0.55 |
| Amount of metal component of Group I and/or II of periodic table wt. ppm | 13 | 11 | ND |
| Amount of halogen and/or inorganic acid radical wt. ppm | ND | ND | ND |
| Sulfur content wt % | 0.3 | 0.25 | 0.3 |
| Properties | | | |
| Izod impact strength (3 min) * kg/cm · cm | 8 | 8 | 7 |
| (30 min) * kg/cm · cm | 8 | 8 | 7 |
| Color hue (YI) | 4 | 3 | 2 |
| Adhesion to mold | A | A | A |
| Synthetic evaluation | A | A | A |

*holding time in a molder

TABLE 2

| Comparative Examples | a-1 | a-2 | a-3 | a-4 |
|---|---|---|---|---|
| Styrene resin composition | | | | |
| Content of rubbery polymer component wt. % | 29.2 | 34.5 | 53.2 | 30.5 |
| Average particle size of rubbery polymer component μm | 0.8 | 0.6 | 0.4 | 0.4 |
| Amount of AAA chain unit % | 0.3 | 0.5 | 0.1 | None |
| Amount of AA chain unit % | 15 | 18 | 9 | 1.8 |
| Reduced viscosity dl/g | 0.50 | 0.59 | 0.55 | 0.45 |
| Amount of metal component of Group I and/or II of periodic table wt. ppm | 12 | >100 | >100 | 13 |
| Amount of halogen and/or inorganic acid rodical wt. ppm | ND | >100 | >100 | 66 |
| Sulfur content wt. % | 0.3 | 0.6 | 0.4 | 0.3 |
| Properties | | | | |
| Izod impact strength (3 min) * kg/cm · cm | 8 | 9 | 10 | 8 |
| (30 min) * kg/cm · cm | 6 | 9 | 8 | 6 |
| Color hue (YI) | 15 | 25 | 25 | 25 |
| Adhesion to mold | A | B | B | B |
| Synthetic evaluation | B | B | B | B |

*holding time in a molder

Test b

In each of Examples b-1 to b-5 and Comparative Examples b-1 to b-4, styrene and acrylonitrile were copolymerized in the presence of a rubbery polymer, whereby a styrene resin was prepared. The resulting styrene resin was blended with a thermoplastic polycarbonate resin. The performance of the resulting composition was evaluated based on the following standards.

1) Izod Impact Strength (Notched) ($KJ/m^2$)

The composition was retained in a cylinder of an injection molder at 260° C. for each of 3 minutes and 30 minutes, it was molded into an injection plate. From the resulting plate, a test piece was cut and its izod impact strength was measured in accordance with Izod impact strength testing method (JIS K7110).

2) Heat Stability

After being retained in a cylinder of an injection molder at 260° C. for 30 minutes, the composition was molded into an injection plate of 3 mm thick and its impact strength and YI were measured.

3) Observation of Adhesion to a Mold

The adhesion to the inside of a venting hole of a extruder after 250 shots at a cylinder temperature of 260° C. and a mold temperature of 50° C. was visually observed. When adhesion was not observed, judgment was A. When adhesion was observed, judgment was B.

EXAMPLE b-1

[(I) Thermoplastic Polycarbonate Resin]

A commercially available polycarbonate polymer free from chlorine was employed. The characteristics of it are shown in Table 3.

TABLE 3

| | Melt flow rate | Vicat softening point |
|---|---|---|
| PC-1 | 2.6 (g/10 min)* | 150.8 (° C.) |

*Measurement Conditions: 230° C. 2.16 kg

[(II) Preparation of Styrene Resin]

A raw material solution composed of 65 parts by weight of styrene, 10 parts by weight of acrylonitrile, 15 parts by weight of ethyl benzene, 10 parts by weight of a butadiene copolymer, 500 ppm of an organic peroxide and 1800 ppm of tertiary dodecyl mercaptan was prepared. The resulting raw material solution was continuously fed to an agitation type reactor having three-stage polymerization tanks arranged in a row, whereby polymerization was carried out. The [AN/(AN+ST)]×100 of each of the second and third tanks was adjusted to a fluctuation range within ±1% of that of the first tank by feeding the monomer to each reactor from a side feed line. From the third tank, the polymer solution was introduced into a separation and collection step composed of a preheater and a vacuum chamber. After the collection step, the resin was fed to an extrusion step, whereby a styrene resin was obtained in the form of pellets. The continuous phase component (S) obtained by removing from the resulting resin a component insoluble in a 7:3 mixture of methyl ethyl ketone and methanol had a reduced viscosity ($\eta_{sp/c}$) of 0.45 dl/g. The rubbery polymer component was contained in an amount of 30.2% and had a weight average particle diameter of 0.8 μm. The chain unit ratio of the unsaturated nitrile monomer unit is measured in the following manner: the continuous phase component (S) is dissolved in chloroform deuteride, $^{13}$C-NMR is measured and by making use of the fact that shifting and division of signal shift of α-carbon of the unsaturated nitrile monomer unit is observed in accordance with a difference in the unit between adjacent monomers, a chain unit ratio is obtained from the integral value. As a result, it has been found that no triple chain unit AAA was detected from the chain distribution of the acrylonitrile monomer unit (A), while a double chain unit AA amounted to 1.8% of the unit A observed.

[Polycarbonate/Styrene Resin Composition]

In an extruder, 100 parts of the above-described polycarbonate (I), 100 parts of the styrene resin (II) obtained above and 0.2 part by weight of an antioxidant were mixed at 270° C. The resulting mixture was injection molded and physical properties and the like of the molded product were measured. The composition was found to contain 7 ppm of a metal component of Group I and/or II of the periodic table in terms of metal and 1 ppm or less of a halogen and/or inorganic acid component. Measuring results of the physical properties are shown in Table 4. Incidentally, prior to extrusion, both the styrene resin and polycarbonate were dried at 100° C. for 12 hours.

EXAMPLE b-2

[Preparation of Styrene Resin (II)]

A raw material solution composed of 55 parts by weight of styrene, 16 parts by weight of acrylonitrile, 20 parts by weight of ethyl benzene, 9 parts by weight of a styrene-butadiene block copolymer, 450 ppm of an organic peroxide and 2000 ppm of tertiary dodecyl mercaptan was prepared. The resulting raw material solution was polymerized as in Example b-1. The [AN/(AN+ST)]×100 of each of the second and third tanks was adjusted to a fluctuation range within ±1% of that of the first tank by feeding the monomer to each reactor from a side feed line. The continuous phase component (S) of the resulting styrene resin had a reduced viscosity of 0.30 dl/g. The rubbery polymer component had a weight average particle size of 1.3 μm and its content was 30.5%. The $^{13}$C-NMR of the continuous phase component (S) obtained by removing from the resulting resin a component insoluble in a 7:3 mixture of methyl ethyl ketone and methanol was measured and the chain unit ratio was determined from the integral of the acrylonitrile monomer unit. As a result, no triple chain unit AAA was detected from the chain distribution of the acrylonitrile monomer unit (A), while the double chain unit AA amounted to 1.93% of the unit A observed.

[Polycarbonate/Styrene Resin Composition]

In an extruder, 100 parts by weight of a polycarbonate obtained in (I) of Example b-1, 66 parts of the styrene resin obtained above in (II) and 0.2 part by weight of an antioxidant were mixed at 270° C. The physical properties of the resulting composition were measured in a similar manner to Example b-1. The composition was found to contain 6 ppm of the metal component of Group I and/or II of the periodic table in terms of and 1 ppm or less of the halogen and/or inorganic acid component. Measuring results of the physical properties are shown in Table 4.

EXAMPLE b-3

In a similar manner to Example b-2 except that the amount of the styrene resin (II) was changed to 100 parts by weight relative to 100 parts by weight of the polycarbonate (I), a resin composition was prepared. The resulting resin composition was found to contain a metal component of Group I and/or II of the periodic table in terms of in an amount of 6 ppm and a halogen and/or inorganic acid component in an amount of 1 ppm or less. The measuring results of the physical properties are shown in Table 4.

EXAMPLE b-4

In a similar manner to Example b-2 except that the amount of the styrene resin obtained in (II) of Example b-2 was changed to 150 parts by weight relative to 100 parts by weight of the polycarbonate (I), a resin composition was prepared. The resulting resin composition was found to contain a metal component of Group I and/or II of the periodic table in terms of in an amount of 3 ppm and a halogen and/or inorganic acid component in an amount of 1 ppm or less. The measuring results of the physical properties are shown in Table 4.

EXAMPLE b-5

[(II) Preparation of a Styrene Resin]

In a similar manner to Example b-1 except that 60 parts by weight of styrene, 13 parts by weight of acrylonitrile, 20 parts by weight of ethyl benzene, 7 parts by weight of an ethylene-propylene-ethylidene norbornene terpolymer (ethylene unit: 58%, diene unit: 5%, intrinsic viscosity: 1.0 dl/g), 450 ppm of an organic peroxide (similar to that employed in Example b-1) and 1600 ppm of tertiary dodecyl mercaptan, a styrene resin was prepared. Incidentally, the [AN/(AN+ST)]×100 of each of the second and third tanks was adjusted to a fluctuation range within ±1% of that of the first tank by feeding the monomer to each reactor from a side feed line. The continuous phase component (S) of the resulting styrene resin had a reduced viscosity of 0.64 dl/g. The rubbery polymer component had a weight average particle size of 2.2 μm and its content was 24.0%. The $^{13}$C-NMR of the continuous phase component (S), which had been obtained by removing from the resulting resin a component insoluble in a 7:3 mixture of methyl ethyl ketone and methanol, was measured and the chain unit ratio was determined from the integral value of the acrylonitrile monomer unit. Then, no triple chain unit AAA was detected from the chain distribution of the acrylonitrile monomer unit (A), while the double chain unit AA amounted to 1.89% of the unit A observed. Neither a metal component of Group I and/or II of the periodic table nor a halogen and/or inorganic acid component was detected.

[Polycarbonate/Styrene Resin Composition]

In an extruder, 100 parts of the polycarbonate obtained in (I) of Example b-1, 100 parts of the styrene resin obtained above in (II) and 0.2 part by weight of an antioxidant were mixed at 270° C. The physical properties were measured as in Example b-1. The composition was found to contain a metal component of Group I and/or II of the periodic table and a halogen and/or inorganic acid component, each in an amount of 1 ppm or less. Measuring results of the physical properties are shown in Table 4.

Comparative Example b-1

[(II) Preparation of Styrene Resin]

In a similar manner to Example b-1 except that 35 parts by weight of styrene, 35 parts by weight of acrylonitrile, 20 parts by weight of ethyl benzene and 10 parts by weight of a butadiene copolymer were used instead, polymerization was carried out. The continuous phase component (S) of the resulting styrene resin had a reduced viscosity (aspic) of 0.50 dl/g. The rubbery polymer component had a weight average particle size of 1.0 μm and its content was 29.2%. As a result of determination of the chain unit ratio of the unsaturated nitrile monomer unit, the triple chain unit AAA amounted to 0.3% of the chain distribution of the acrylonitrile monomer unit (A) and the double chain unit AA amounted to 15% of the unit A observed.

[Polycarbonate/Styrene Resin Composition]

In an extruder, 100 parts of the polycarbonate obtained in (I) of Example b-1, 100 parts of the styrene resin obtained above in (II) and 0.2 part by weight of an antioxidant were mixed at 270° C. The physical properties were measured as in Example b-1. The composition was found to contain a metal component of Group I and/or II of the periodic table in terms of metal in an amount of 6 ppm and a halogen and/or inorganic acid component in an amount of 1 ppm or less. Measuring results of the physical properties are shown in Table 5.

Comparative Example b-2

[(II) Preparation of Styrene Resin]

Twenty parts by weight (solid content) of a polybutadiene latex, 40 parts by weight of styrene and 40 parts by weight of acrylonitrile were subjected to emulsion graft polymerization. The latex of the graft copolymer thus obtained was coagulated with dilute sulfuric acid, followed by washing, filtration and drying. The continuous phase component (S) of the resulting copolymer had a reduced viscosity of 0.59 dl/g. The rubbery polymer component had a weight average particle size of 0.2 μm and its content was 34.5%. As a result of determination of the chain distribution ratio, a triple chain unit AAA amounted to 0.5% of the chain distribution of the acrylonitrile monomer unit (A) and a double chain unit AA amounted to 18% of the unit A observed.

[Polycarbonate/Styrene Resin Composition]

In an extruder, 100 parts of the polycarbonate obtained in (I) of Example b-1, 100 parts of the styrene resin obtained above in (II) and 0.2 part by weight of an antioxidant were mixed at 270° C. The physical properties were measured as in Example b-1. The composition was found to contain a metal component of Group I and/or II of the periodic table in terms of metal and a sulfur component, each in an amount of 100 ppm or greater. Measuring results of the physical properties are shown in Table 5.

Comparative Example b-3

[(II) Preparation of Styrene Resin]

Thirty parts by weight (solid content) of a polybutadiene latex, 45 parts by weight of styrene and 25 parts by weight of acrylonitrile were subjected to emulsion graft polymerization. The latex of the graft copolymer thus obtained was coagulated with calcium chloride, followed by washing, filtration and drying. The continuous phase component (S) of the resulting copolymer had a reduced viscosity of 0.55 dl/g. The rubbery polymer component had a weight average particle size of 0.3 μm and its content was 43.2%. As a result of determination of the chain distribution ratio of the polymer, a triple chain unit AAA was detected in an amount of 0.1% from the chain distribution of the acrylonitrile monomer unit (A) and a double chain unit AA amounted to 9% of the unit A observed.

[Polycarbonate/Styrene Resin Composition]

In an extruder, 100 parts of the polycarbonate obtained in (I) of Example b-1, 100 parts of the styrene resin obtained above in (II) and 0.2 part by weight of an antioxidant were mixed at 270° C. The physical properties were measured as in Example b-1. The composition was found to contain a metal component of Group I and/or II of the periodic table in terms of metal and chlorine, each in an amount of 100 ppm or greater. Measuring results of the physical properties are shown in Table 5.

Comparative Example b-4

In an extruder, 100 parts by weight of the polycarbonate obtained in (I) of Example b-1, 100 parts by weight of the styrene resin obtained above in (II) of Example b-1, 0.1 part by weight of sodium stearate and 0.2 part by weight of an antioxidant were mixed at 270° C. Then, physical properties of the composition were measured as in Example b-1. Measuring results of the physical properties are shown in Table 5.

TABLE 4

| Examples | b-1 | b-2 | b-3 | b-4 | b-5 |
|---|---|---|---|---|---|
| Blending | | | | | |
| PC-1 | 100 | 100 | 100 | 100 | 100 |
| ABS resin | 100 | 66 | 100 | 150 | 100 |
| Content of rubbery polymer component wt. ppm | 30.2 | 30.5 | 30.5 | 30.5 | 24.0 |
| Average particle size of rubbery polymer component μm | 0.8 | 1.3 | 1.3 | 1.3 | 2.2 |
| Amount of AAA chain unit % | None | None | None | None | None |
| Amount of AA chain unit % | 1.8 | 1.93 | 1.93 | 1.93 | 1.89 |
| Reduced viscosity dl/g | 0.45 | 0.30 | 0.30 | 0.30 | 0.64 |
| Metal component of Group I and/or II of the periodic table wt. ppm | 7 | 6 | 6 | 6 | <1 |
| Halogen and/or inorganic acid radical wt. ppm | <1 | <1 | <1 | <1 | <1 |
| Sulfur content wt. % | 0.3 | 0.4 | 0.4 | 0.4 | 0.28 |
| Properties | | | | | |
| Izod impact strength (3 min.)* kg/cm · cm | 86 | 94 | 98 | 90 | 62 |
| (30 min.)* | 85 | 92 | 98 | 90 | 62 |
| Color hue (YI) | 9 | 8 | 6 | 6 | 5 |
| Metal adhesion | A | A | A | A | A |
| Synthetic evaluation | A | A | A | A | A |

*holding time in a molder

TABLE 5

| Comparative Examples | b-1 | b-2 | b-3 | b-4 |
|---|---|---|---|---|
| Blending | | | | |
| PC-1 | 100 | 100 | 100 | 100 |
| ABS resin | 100 | 100 | 100 | 100 |
| Content of rubbery polymer component wt. ppm | 29.2 | 34.5 | 43.2 | 30.2 |
| Average particle size of rubbery polymer component μm | 1.0 | 0.2 | 0.3 | 0.8 |
| Amount of AAA chain unit % | 0.3 | 0.5 | 0.1 | None |
| Amount of AA chain unit % | 15.0 | 18.0 | 9.0 | 1.8 |
| Reduced viscosity dl/g | 0.50 | 0.59 | 0.55 | 0.45 |
| Metal component of Group I and/or II of the periodic table wt. ppm | 6 | >100 | >100 | <1 |
| Halogen and/or inorganic acid | 44.5 | >100 | >100 | None |

TABLE 5-continued

| Comparative Examples | b-1 | b-2 | b-3 | b-4 |
|---|---|---|---|---|
| radical wt. ppm | | | | |
| Sulfur content wt. % | 0.3 | 0.4 | 0.4 | 0.4 |
| Properties | | | | |
| Izod impact strength (3 min.)* kg/cm · cm | 86 | 54 | 50 | 45 |
| (30 min.)* | 80 | 46 | 43 | 15 |
| Color hue (YI) | 18 | 30 | 30 | 20 |
| Metal adhesion | A | B | B | B |
| Synthetic evaluation | B | B | B | B |

*holding time in a molder

Test c

In each of Examples c-1 to c-8 and Comparative Examples c-1 to c-3, styrene and acrylonitrile were copolymerized in the presence of a rubbery polymer, whereby a styrene resin was prepared. The resulting resin was blended with a thermoplastic polycarbonate resin. The resulting styrene resin, resin composition with a thermoplastic polycarbonate resin, and a formed or molded product therefrom was subjected to a recycling test. The performance was evaluated as in Test a.

Incidentally, as the thermoplastic polycarbonate resin (II), that shown in Table 3 was employed.

EXAMPLE c-1

[(I) Preparation of Styrene Resin (ABS Resin)]

A raw material solution composed of 62 parts by weight of styrene, 14 parts by weight of acrylonitrile, 14 parts by weight of ethyl benzene, 10 parts by weight of a butadiene polymer, 400 wt.ppm of an organic peroxide and 1800 wt.ppm of tertiary dodecyl mercaptan was prepared. The resulting solution was fed continuously to an agitation type reactor having three polymerization tanks arranged in a row, wherein polymerization was conducted. The [AN/(AN+ST)]×100 of each of the second and third tanks was adjusted to a fluctuation range within ±1% of that of the first tank by feeding the monomer from a side feed line. The polymer solution was introduced from the last tank to a separation and collection step formed of a preheater and a vacuum chamber. The polymer was fed to an extrusion step from the collection step, wherein an ABS resin was obtained in the form of pellets. The continuous phase component (S) of the resulting ABS resin had a reduced viscosity of 0.45 dl/g. The content of the rubbery polymer component was 19.2% and its weight average particle size was 1.1 μm. The continuous phase component (S) obtained by removing from the polymer a component insoluble in a 7:3 mixture of methyl ethyl ketone and methanol was dissolved in chloroform deuterade and $^{13}$C-NMR was measured. From the integral value obtained by making use of the division of the signal shift of a-carbon of the acrylonitrile monomer unit, the chain unit ratio was determined. As a result, it has been found that no triple chain unit AAA was detected from the chain distribution of the acrylonitrile monomer unit (A), while a double chain unit AA amounted to 2.03% of the unit A observed.

The sulfur content was found to be 0.3 wt. %. Measurement results of the physical properties are shown in Table 6.

EXAMPLE c-2

[Thermoplastic Polycarbonate Resin/ABS Resin Composition]

In an extruder, 100 parts by weight of the above-described thermoplastic polycarbonate resin (II), 100 parts by weight of the ABS resin (I) obtained in Example c-1 and 0.2 part by weight of an antioxidant were mixed at 260° C. The measurement results of physical properties were shown in Table 6. Incidentally, prior to extrusion, both the ABS resin and thermoplastic polycarbonate resin were dried at 100° C. for 12 hours.

EXAMPLE c-3

In a similar manner to Example c-1 except for the use of 100 parts by weight of the thermoplastic polycarbonate resin obtained in Example c-1 and 67 parts by weight of the ABS resin obtained in Example c-1 instead, a resin composition was obtained. Results are shown in Table 6.

EXAMPLE c-4

A raw material solution composed of 62 parts by weight of styrene, 15 parts by weight of acrylonitrile, 20 parts by weight of ethyl benzene, 12 parts by weight of a styrene-butadiene block copolymer, 450 wt.ppm of an organic peroxide and 2000 wt.ppm of tertiary dodecyl mercaptan was prepared. The resulting solution was polymerized as in Example c-1. Incidentally, the value of [AN/(AN+ST)]×100 of each of the second and third tanks was adjusted to a fluctuation range within ±1% of that of the first tank by feeding the monomer from a side feed line.

The continuous phase component (S) of the resulting ABS resin had a reduced viscosity of 0.37 dl/g. The rubbery polymer component had a weight average particle size of 1.3 μm and its content was 25%. The $^{13}$C-NMR of the continuous phase component (S) obtained by removing from the resin a component insoluble in a 7:3 mixture of methyl ethyl ketone and methanol was measured. From the integral value of the acrylonitrile monomer unit, the chain unit ratio was determined. As a result, it has been found that no triple chain unit AAA was detected from the chain distribution of the acrylonitrile monomer unit (A), while the double chain unit AA amounted to 1.93% of the unit A observed. The sulfur content was found to be 0.4 wt. % in terms of sulfur. Mixing of the thermoplastic polycarbonate resin and ABS resin was carried out as in Example 1. Measurement results of the physical properties are shown in Table 6.

EXAMPLE c-5

In a similar manner to Example c-1 except that 8 parts by weight of acrylonitrile, 20 parts by weight of ethylbenzene, 10 parts by weight of a rubbery polymer (similar to that used in Example c-1), 500 wt.ppm of an organic peroxide and 1800 wt.ppm of tertiary dodecyl mercaptan were used instead, polymerization was carried out. Incidentally, the [AN/(AN+ST)]×100 of each of the second and third tanks was adjusted to a fluctuation range within ±1% of that of the first tank by supplying the monomer from a side feed line.

The continuous phase component (S) of the resulting ABS resin had a reduced viscosity of 0.40 dl/g. The rubbery polymer component had a weight average particle size of 0.8 μm and its content was 22.0%. The $^{13}$C-NMR of a component obtained by removing from the polymer a component insoluble in a 7:3 mixture of methyl ethyl ketone and methanol was measured and the chain unit ratio was determined from the integral value of the acrylonitrile monomer unit. As a result, from the chain distribution of the acrylonitrile monomer unit (A), no triple chain unit AAA was observed, while the double chain unit AA amounted to 1.87% of the unit A observed. The sulfur content was 0.4 wt. %. With 100 parts by weight of a thermoplastic polycarbonate resin, 67 parts by weight of the ABS resin obtained above was mixed and measurement results of the physical properties of the resulting resin composition are shown in Table 6.

EXAMPLE c-6

By using 62 parts by weight of styrene, 13 parts by weight of acrylonitrile, 15 parts by weight of ethylbenzene, 9 parts by weight of a rubbery polymer (similar to that used in Example c-1), 450 wt.ppm of an organic peroxide and 2600 wt.ppm of tertiary dodecyl mercaptan, an ABS resin was obtained. Incidentally, the [AN/(AN+ST)]×100 of each of the second and third tanks was adjusted to a fluctuation range within ±1% of that of the first tank by supplying the monomer from a side feed line.

The continuous phase component (S) of the resulting ABS resin had a reduced viscosity of 0.35 dl/g. The rubbery polymer component had a weight average particle size of 2.2 $\mu$m and its content was 19.8%. The $^{13}$C-NMR of a component obtained by removing from the polymer a component insoluble in a 7:3 mixture of methyl ethyl ketone and methanol was measured and a chain unit ratio was determined from the integral value of the acrylonitrile monomer unit. As a result, from the chain distribution of the acrylonitrile monomer unit (A), no triple chain unit AAA was observed, while the double chain unit AA amounted to 1.89% of the unit A observed. The sulfur content was 0.45 wt. %. With 100 parts by weight of a thermoplastic polycarbonate resin, 300 parts by weight of the ABS resin obtained above was mixed and measurement results of the physical properties of the resulting resin composition are shown in Table 6.

TABLE 6

| Examples | c-1 | c-2 | c-3 | c-4 | c-5 | c-6 |
|---|---|---|---|---|---|---|
| Blending | | | | | | |
| PC-1 | 0 | 100 | 100 | 100 | 100 | 100 |
| ABS resin | 100 | 100 | 67 | 100 | 67 | 300 |
| Content of rubbery polymer component % | 19.2 | 19.2 | 19.2 | 25.0 | 22.0 | 19.8 |
| Average particle size of rubbery polymer component $\mu$m | 1.1 | 1.1 | 1.1 | 1.3 | 0.8 | 2.2 |
| Amount of AAA chain unit % | None | None | None | None | None | None |
| Amount of AA chain unit % | 2.03 | 2.03 | 2.03 | 1.93 | 1.87 | 1.89 |
| Reduced viscosity dl/g | 0.45 | 0.45 | 0.45 | 0.37 | 0.40 | 0.35 |
| Metal component of Group I and/or II of the periodic table (wt. ppm) | 8 | 8 | 8 | 7 | 9 | <1 |
| Halogen and/or inorganic acid radical (wt. ppm) | <1 | <1 | <1 | <1 | <1 | <1 |
| Sulfur content wt. % | 0.3 | 0.3 | 0.3 | 0.4 | 0.4 | 0.45 |
| Properties | | | | | | |
| Izod impact strength (kg/cm · cm) | 20 | 85 | 75 | 90 | 83 | 67 |
| Vicat softening point ° C. | 110 | 129 | 138 | 130 | 137.2 | 122 |

TABLE 6-continued

| Examples | c-1 | c-2 | c-3 | c-4 | c-5 | c-6 |
|---|---|---|---|---|---|---|
| Metal adhesion | A | A | A | A | A | A |
| Synthetic evaluation | A | A | A | A | A | A |

EXAMPLE c-7

A number of test pieces were formed from the resin composition obtained in Example c-2. After pulverization, 0.1 part by weight of an antioxidant was added, followed by mixing and pelleting in an extruder at 260° C. Prior to extrusion, the resin composition of the ABS resin and thermoplastic polycarbonate resin was dried at 100° C. for 12 hours. As a result of evaluation of the resulting pellets, there was no difference in the impact strength and softening point from the test pieces obtained in the first operation. The adhesion to a mold was not observed so that the resin composition was found to be suitable for recycling use.

EXAMPLE c-8

A number of test pieces were formed from the ABS resin obtained in Example c-1. After pulverization, 0.1 part by weight of an antioxidant was added, followed by mixing and pelleting in an extruder at 260° C. Prior to extrusion, the resin composition of the ABS resin and thermoplastic polycarbonate resin was dried at 100° C. for 12 hours. As a result of evaluation of the resulting pellets, there was no difference in the impact strength and softening point from the test pieces obtained in the first operation. The adhesion to a mold was not observed so that the resin composition was found to be suitable for recycling use.

Comparative Example c-1

In a similar manner to Example c-3 except that 60 parts by weight of styrene, 20 parts by weight of acrylonitrile, 15 parts by weight of ethyl benzene, 9.5 parts by weight of a rubbery polymer (similar to that employed in Example c-1), 0.05 part by weight of an organic peroxide and 0.08 part by weight of tertiary dodecyl mercaptan were used instead, polymerization was carried out. The polymer component (S) of the resulting ABS resin had a reduced viscosity of 0.68 dl/g. The rubbery polymer component had a weight average particle size of 1.0 $\mu$m and its content was 18.3%. The $^{13}$C-NMR of a component obtained by removing from the polymer a component insoluble in a 7:3 mixture of methyl ethyl ketone and methanol was measured and the chain unit ratio was determined from the integral value of the acrylonitrile monomer unit. As a result, from the chain distribution of the acrylonitrile monomer unit (A), no triple chain unit AAA was observed, while the double chain unit AA amounted to 4.85% of the unit A observed. The sulfur content was 0.25 wt. %. The thermoplastic polycarbonate resin and ABS resin were mixed as in Example c-1. The measurement results of the physical properties are shown in Table 7.

Comparative Example c-2

In a similar manner to Example c-3 except that 46 parts by weight of styrene, 23 parts by weight of acrylonitrile, 15 parts by weight of ethyl benzene, 0.05 part by weight of an organic peroxide and 0.15 part by weight of tertiary dodecyl mercaptan were used instead, polymerization was carried out. The polymer component (S) of the resulting ABS resin had a reduced viscosity of 0.58 dl/g. The rubbery polymer component had a weight average particle size of 2.7 µm and its content was 17 parts by weight. The $^{13}$C-NMR of a component obtained by removing from the polymer a component insoluble in a 7:3 mixture of methyl ethyl ketone and methanol was measured and the chain unit ratio was determined from the integral value of the acrylonitrile monomer unit. As a result, from the chain distribution of the acrylonitrile monomer unit (A), a triple chain unit AAA amounted to 0.23% of the unit A observed, while a double chain unit AA amounted to 6.86% of the unit A observed. The sulfur content was 0.3 wt. % in terms of sulfur. The thermoplastic polycarbonate resin and ABS resin were mixed as in Example c-1. The measurement results of the physical properties are shown in Table 7.

Comparative Example c-3

Thirty parts by weight of polybutadiene latex, 34.8 parts by weight of styrene and 5.2 parts by weight of acrylonitrile were subjected to emulsion graft polymerization. The resulting graft copolymer latex was coagulated with dilute sulfuric acid, followed by washing, filtration and drying. The continuous phase component (S) of the resulting copolymer had a reduced viscosity of 0.49 dl/g. The rubbery polymer component had an average particle size of 0.5 µm and its content was 27 parts by weight. The $^{13}$C-NMR of a component obtained by removing from the polymer a component insoluble in a 7:3 mixture of methyl ethyl ketone and methanol was measured and the chain unit ratio was determined from the integral value of the acrylonitrile monomer unit. As a result, from the chain distribution of the acrylonitrile monomer unit (A), a triple chain unit AAA amounted to 0.18% of the unit A observed, while the double chain unit AA amounted to 5.47% of the unit A observed. A metal in terms of metal component of Group I and/or II of the periodic table was detected in an amount of 100 wt.ppm or greater. The thermoplastic polycarbonate resin and ABS resin were mixed as in Example c-1. The measurement results of the physical properties are shown in Table 7.

TABLE 7

| Comparative Examples | C-1 | C-2 | C-3 |
|---|---|---|---|
| Blending | | | |
| PC-1 | 100 | 100 | 100 |
| ABS resin | 100 | 100 | 100 |
| Content of rubbery polymer component wt. ppm | 18.3 | 17.2 | 27.1 |
| Average particle size of rubbery polymer component µm | 1.0 | 2.7 | 0.5 |
| Amount of AAA chain unit % | 0 | 0.23 | 0.18 |
| Amount of AA chain unit % | 4.85 | 6.86 | 5.45 |
| Reduced viscosity dl/g | 0.68 | 0.58 | 0.49 |
| Metal component of Group I and/or II of the periodic table wt. ppm | 8 | 6 | >100 |
| Halogen and/or inorganic acid radical wt. ppm | <1 | <1 | >100 |
| Sulfur content wt. % | 0.25 | 0.3 | — |
| Properties | | | |
| Izod impact strength (kg/cm · cm) | 55 | 45 | 66 |
| Vicat softening point ° C. | 128.2 | 129.3 | 130.0 |
| Metal adhesion | A | A | A |
| Coloring when recycled | Observed | Observed | Observed |

What is claimed is:

1. A styrene resin obtained by continuous bulk or solution polymerization with control of the ratio of unsaturated nitrile monomer/styrene monomer to a predetermined value in the styrene resin, said styrene resin comprising 50 to 90 wt. % of a continuous phase component (S) composed of a copolymer of a styrene monomer and an unsaturated nitrile monomer, or a styrene monomer, an unsaturated nitrile monomer and another monomer copolymerizable therewith; and 10 to 50 wt. % of a dispersed phase component composed of a rubbery polymer component on which said monomers have been graft polymerized and which has occluded said copolymer; wherein from the unsaturated nitrile monomer unit (A) of the continuous phase component (S), no triple chain unit AAA is detected and a double chain unit AA amounts to 3% or less based on the whole units (A) detected, a reduced viscosity ($\eta_{sp/c}$) of the continuous phase component (S) is 0.2 to 0.85 dl/g and the content of a metal component of Group I and/or II of the periodic table in terms of metal is 100 wt.ppm or less in terms of a metal.

2. A styrene resin according to claim 1, wherein said dispersed phase component has a weight average particle size of 0.1 to 3 µm.

3. A styrene resin according to claim 1, further comprising 0.01 to 0.5 wt. % of an organic sulfur compound in terms of a sulfur content.

4. A styrene resin according to claim 1, wherein the continuous phase component (S) has a reduced viscosity ($\eta_{sp/c}$) of 0.2 to 0.65 dl/g.

5. A styrene resin according to claim 1, wherein the AA chain unit of the continuous phase component (S) amounts to 2.5% or less based on the whole units (A) detected.

6. A styrene resin according to claim 1, wherein the AA chain unit of the continuous phase component (S) amounts to 2.0% or less based on the whole units (A) detected.

7. A styrene resin according to claim 1, wherein the measurement of the unsaturated nitrile monomer component (A) in the continuous phase component (S) is conducted by $^{13}$C-NMR.

8. A styrene resin according to claim 1, wherein the metal component of Group I and/or II of the periodic table in terms of metal is contained in an amount of 20 wt.ppm or less in terms of a metal.

9. A styrene resin according to claim 8, wherein a total amount of a halogen compound and an inorganic acid does not exceed 10 wt.ppm in terms of halogen and acid radical.

10. A resin composition comprising 10 to 500 parts by weight of a styrene resin as claimed in claim 1 and 100 parts by weight of a thermoplastic polycarbonate resin having a viscosity average molecular weight of 8,000 to 55,000.

11. A resin composition according to claim 10, which comprises 20 to 300 parts by weight of a styrene resin and 100 parts by weight of a thermoplastic polycarbonate resin.

12. A recycling method, which comprises collecting a molded or formed product of a styrene resin as claimed in claim 1 and producing therefrom another molded or formed product.

13. A recycling method, which comprises collecting a molded or formed product of a resin composition as claimed in claim 10 and producing therefrom another molded or formed product.

14. A styrene resin obtained by continuous bulk or solution polymerization using series polymerization reactors with control of the ratio of unsaturated nitrile monomer/styrene monomer to a predetermined value in the styrene resin by feeding unsaturated nitrile monomer and/or styrene monomer to each reactor, said styrene resin comprising 50 to 90 wt. % of a continuous phase component (S) composed of a copolymer of a styrene monomer and an unsaturated nitrile monomer, or a styrene monomer, an unsaturated nitrile monomer and another monomer copolymerizable therewith; and 10 to 50 wt. % of a dispersed phase component composed of a rubbery polymer component on which said monomers have been graft polymerized and which has occluded said copolymer; wherein from the unsaturated nitrile monomer unit (A) of the continuous phase component (S), no triple chain unit AAA is detected and a double chain unit AA amounts to 3% or less based on the whole units (A) detected, a reduced viscosity ($\eta_{sp/c}$) of the continuous phase component (S) is 0.2 to 0.85 dl/g and the content of a metal component of Group I and/or II of the periodic table in terms of metal is 100 wt.ppm or less in terms of a metal.

15. A styrene resin obtained by continuous bulk or solution polymerization using series polymerization reactors with control of the ratio of unsaturated nitrile monomer/styrene monomer to ±3% of a predetermined value in the polymerization system, said styrene resin comprising 50 to 90 wt. % of a continuous phase component (S) composed of a copolymer of a styrene monomer and an unsaturated nitrile monomer, or a styrene monomer, an unsaturated nitrile monomer and another monomer copolymerizable therewith; and 10 to 50 wt. % of a dispersed phase component composed of a rubbery polymer component on which said monomers have been graft polymerized and which has occluded said copolymer; wherein from the unsaturated nitrile monomer unit (A) of the continuous phase component (S), no triple chain unit AAA is detected and a double chain unit AA amounts to 3% or less based on the whole units (A) detected, a reduced viscosity ($\eta_{sp/c}$) of the continuous phase component (S) is 0.2 to 0.85 dl/g and the content of a metal component of Group I and/or II of the periodic table in terms of metal is 100 wt.ppm or less in terms of a metal.

\* \* \* \* \*